United States Patent [19]
Donner et al.

[11] 4,436,298
[45] Mar. 13, 1984

[54] SHEET FEEDER

[75] Inventors: Siegmar Donner, Friedberg; Günter Strempler; Manfred Schmid, both of Augsburg, all of Fed. Rep. of Germany

[73] Assignees: Kleindienst GmbH & Co.; KG Maschinenfabrik, both of Fed. Rep. of Germany

[21] Appl. No.: 288,934

[22] Filed: Jul. 31, 1981

[30] Foreign Application Priority Data

Aug. 2, 1980 [DE] Fed. Rep. of Germany ....... 3029458

[51] Int. Cl.³ .............................................. B65H 3/52
[52] U.S. Cl. ..................................... 271/10; 271/111; 271/118; 271/122; 271/251
[58] Field of Search ................. 271/10, 109, 110, 111, 271/114, 117, 118, 122, 125, 251

[56] References Cited

U.S. PATENT DOCUMENTS 2,819,078 1/1958 Durand .......................... 271/251 X
3,108,801 10/1963 Van Dalen .
3,272,500 9/1966 Van Dalen et al. .
3,743,275 7/1973 Miller et al. .
3,981,497 9/1976 Feinstein ......................... 271/117 X

FOREIGN PATENT DOCUMENTS 2209483 9/1973 Fed. Rep. of Germany .
2119430 5/1975 Fed. Rep. of Germany .

OTHER PUBLICATIONS

IBM Technical Disclosure Bulletin, vol. 2, Feb. 5, 1960, pp. 3 and 4.

Primary Examiner—Richard A. Schacher
Attorney, Agent, or Firm—Karl F. Ross

[57] ABSTRACT

A sheet feeder comprises a support adapted to hold a stack of sheets, and a straight guide rail extending from the stack parallel to a transport direction and defining a transport path extending in this direction. A generally cylindrical sheet-lifting roller is provided above the support and is vertically engageable with the topmost sheet of the stack, this lifting roller being centered on and rotatable about an axis inclined to the transport direction and rail. This lifting roller can be rotated about the respective axis while in contact with the topmost sheet of the stack for displacing the topmost sheet in the transport direction and toward the rail. Feed rollers downstream of the lift roller are rotated to advance a sheet engaged thereby along the transport path in the transport direction.

6 Claims, 7 Drawing Figures

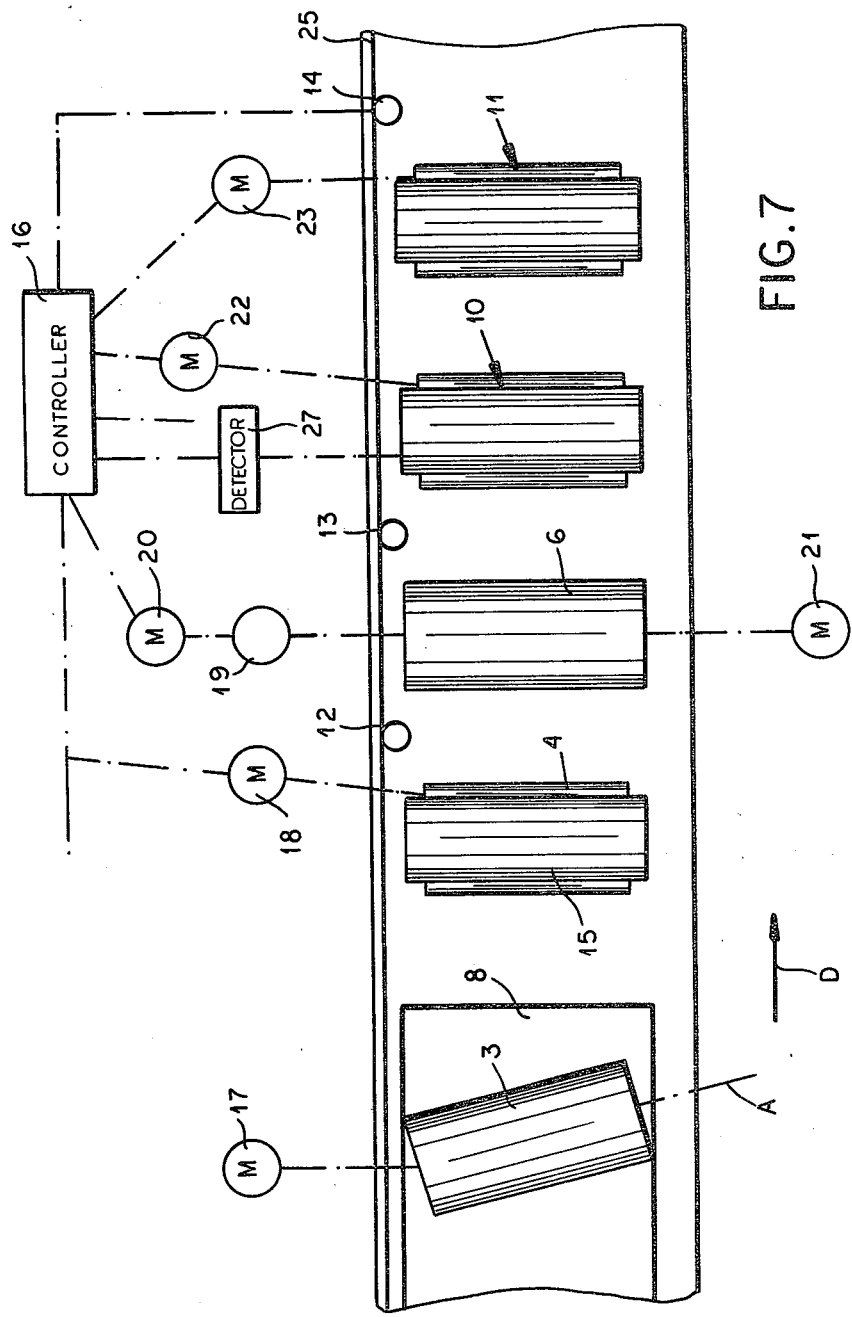

SHEET FEEDER

FIELD OF THE INVENTION

The present invention relates to a sheet feeder. More particularly this invention concerns a sheet feeder used for taking sheets, which may be of different sizes, one-by-one off a stack and feeding them to a reader or the like.

BACKGROUND OF THE INVENTION

It is standard practice nowadays in a modern office for a document, which may be constituted as a stack of typewritten sheets of different sizes, to be read by an automatic device which tranlates the document into a form, such as magnetic disks, more convenient for editing or processing than the printed page. The standard difficulty with such a system is at input, that is in individually scanning the individual sheets.

Accordingly sheet feeders are known, as for example seen in German Pat. No. 2,119,430, in German published patent application No. 2,209,483, and in U.S. Pat. Nos. 3,148,877 and 3,175,824. Such devices all employ one or more rollers that advance the topmost sheet of the stack of sheets in a transport direction. Once this topmost sheet has been moved some distance and separated from any other sheets a skew roller urges the sheet laterally relative to the transport direction against a guide rail or ledge so that the sheet is properly aligned when it comes under the scanner.

The main problem with these known arrangements is that the travel path for the sheets is quite long. As a result the systems incorporating them are extremely bulky and must be designed to stand alone. This style of construction also of course increases the cost of the sheet feeder, and makes it inappropriate for a small office, which must then resort to manual feeding in order to avoid wasting valuable space on a standard long sheet feeder.

OBJECTS OF THE INVENTION

It is therefore an object of the present invention to provide an improved sheet feeder.

Another object is the provision of such a sheet feeder which is substantially shorter and mechanically simpler than the prior-art feeders.

SUMMARY OF THE INVENTION

These objects are attained according to the instant invention in a sheet feeder comprising a support adapted to hold a stack of sheets, and a straight guide rail extending from the stack parallel to a transport direction and defining a transport path extending in this direction. A generally cylindrical sheet-lifting roller is provided above the support and is vertically engageable with the topmost sheet of the stack, this lifting roller being centered on and rotatable about an axis inclined to the transport direction and rail. Means is provided for rotating this lifting roller about the respective axis while in contact with the topmost sheet of the stack for displacing the topmost sheet in the transport direction and toward the rail. Feed rollers downstream of the lift roller are operated by rotating means to advance a sheet engaged thereby along the transport path in the transport direction.

Thus the system according to the instant invention moves the sheet in the transport direction and simultaneously also somewhat laterally relative thereto on taking it off the stack. As a result the sheet is moved into position against the guide rail as soon as it is taken off the sheet stack. Obviously this type of operation shortens the path the sheet must follow in the sheet feeder. At the same time it has surprisingly been found that this procedure also decreases the likelihood that an underlying sheet will stick to the topmost sheet. Apparently such partially diagonal movement of the top sheet can never be with the nap of the paper or otherwise be in a direction in which the sheets naturally stick together.

According to another feature of this invention the lift roller is vertically displaceable. The feeder also has means for vertically displacing the lift roller and urging it periodically down into contact with the topmost sheet of the stack. Thus the lift roller will not crumple an underlying sheet up against the guide rail or ledge. The lift-roller axis forms an angle of between 60° and 89° with the transport direction, but since it is lifted up right after it moves the topmost sheet off the stack it will not damage a sheet already resting against the guide edge.

The feeder according to this invention further has a stripper roller underneath the path immediately downstream of the stack and means for rotating this stripper roller in a direction to displace a sheet resting on it back against the transport direction. A freely rotatable stripper roller above the stripper roller is vertically displaceable into engagement with this stripper roller and is operated by means for vertically displacing itself into and out of contact with the stripper roller. These two rollers therefore act together to effectively strip off an underlying sheet which may be pulled off with the top sheet. More particularly according to this invention, control means is provided connected to both of the means for vertically displacing for urging the freely rotatable roller down only when the lift roller is up out of contact with the stack. In this manner an underlying sheet that is stripped off the top sheet can be pushed back onto the stack and the lift roller will not get in its way.

In accordance with another feature of this invention, the feed rollers include upper and lower pinch rollers and means for rotating the lower pinch roller continuously in a direction urging a sheet in contact with it back against the transport direction and for rotating the upper pinch roller discontinuously in a direction urging a sheet in contact with it in the transport direction. The means for rotating the upper pinch roller includes a clutch permitting the upper pinch roller to rotate freely when not driven. Hence these pinch rollers can send back all the sheets they pinch if an extra sheet cannot be separated from the top sheet, for another try right from the start.

It is also possible according to the instant invention to detect an extra sheet stuck to the bottom of the top sheet peeled off the stack by the lift roller by means of a downstream pair of feed rollers flanking the path, means for detecting the spacing between this pair of feed rollers, and means for reverse driving the pair of feed rollers to advance any sheets engaged therebetween back against said direction when the spacing between the pair of rollers exceeds the thickness of a single sheet. This system is normally combined with means for allowing the upstream stripper or separator roller that is normally rotated in the transport direction to be reverse rotated or at least to rotate freely, so that the returning sheets can easily pass back between them to the stack. Simultaneously the lift roller and upper strip roller are normally elevated to clear the way. This backup system therefore prevents two sheets from getting fed through the system, so that the underlying one is not read.

Edge sensors are normally provided for detecting passage of the sheet along the path. Such sensors may simply be constituted as photocell-lamp combinations, or may actually have microswitch-operating feelers in the path. Such sensors are described in *Servomechanism Practice* by Ahrendt and Savant (McGraw-Hill: 1960).

The system according to the instant invention is quite simple and relatively small. It can be built into a desk-top-size reader and can be counted on to operate with minor service problems. The procedure of sending back to the stack sheets which stick together, although it slows operation down somewhat, has been found to eliminate the need for all types of normally used fail-safe detecting and separating devices.

DESCRIPTION OF THE DRAWING

The above and other features and advantages will become more readily apparent from the following, reference being made to the accompanying drawing in which:

FIG. 7 is a top view of FIG. 1.

SPECIFIC DESCRIPTION

Figure 1:
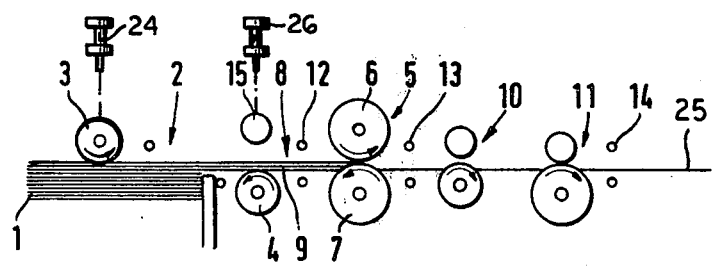
FIG. 1 is a side partly schematic view of the apparatus according to this invention.

As seen in FIGS. 1 and 7 the system according to the instant invention acts on a stack 1 of sheets 2 which may be of different sizes and formats. A lift roller 3 having an axis A that forms an acute angle to the transport direction D is vertically displaceable by means such as the cylinder indicated at 24 in FIG. 1 that itself is operated from a controller 16, and is rotationally driven in the direction indicated by the arrow by means of a motor 17 also operated by this controller 16. A rail 25 extends along the transport path through the feeder, running perfectly parallel to the direction D.

Immediately downstream in the direction D from the stack 1 is a lower braking or stripper roller 4 that is reverse driven, that is rotated in a sense to urge a sheet lying on it back against the direction D, by means of a motor 18 also operated by the controller. A freely rotatable idler roller 15 can be vertically displaced by another cylinder 26 vertically above the stripper roller 4. Another separating or stripping mechanism 5 formed by another pair of pinch rollers including an upper roller 6 and a lower roller 7 is provided immediately downstream of the rollers 4 and 15. The lower roller 7 is continuously reverse driven by a motor 21 and the roller 6 is connected through a clutch 19 to a respective drive motor 20 that normally operates it for forward displacement of a sheet engaged between it and the roller 7.

A pair of thickness-detecting drive rollers 10, the lower one of which is driven by a reversible motor 22, is provided downstream of the rollers 6 and 7 and is connected to a thickness detector 27 which is in turn connected to the controller 16 that operates all the various cylinders and motors. Downstream of these rollers 10 is a pair of drive rollers 11.

Edge detectors 12, 13, and 14 of the photocell type are provided respectively immediately downstream of the rollers 15, 6, and 11 and are connected to the controller 16 for synchronous operation of the various drive motors and cylinders.

The system described above functions as follows:

The controller 16 presses the lift roller 3, while it is rotated by the drive motor 17, down against the stack 1 to displace at least the topmost sheet 8 both downstream in the direction D and somewhat laterally toward the guide rail 25. FIG. 1 shows how a sheet 9 is simultaneously displaced with the top sheet 8. This underlying sheet or sheets 9 will be urged back against the direction D by the roller 4 and then by the roller 7, so that normally everything but the topmost sheet 8 will be peeled off and sent back to the stack 1.

Figure 2:
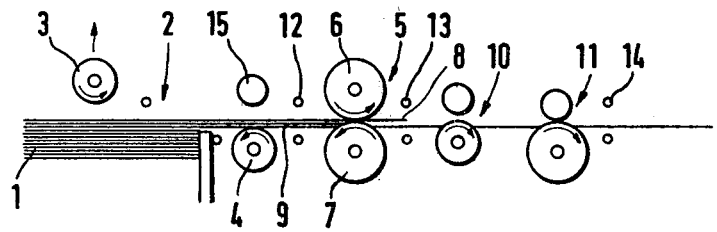
FIGS. 2-4 are views similar to FIG. 1 showing the apparatus in subsequent operational positions.
Figure 3:
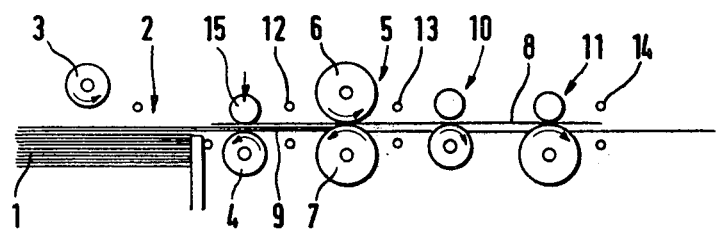

FIGS. 2 and 3 show how this separating or stripping function is aided by the vertical displaceability of the rollers 3 and 15. First the roller 3 lifts so that any forces urging the sheets 8 and 9 forwardly are largely eliminated. This lifting of the roller 3 is triggered by the edge sensor 12 when it detects the passing of the leading edge of a sheet 2. Such lifting of the roller 3 also prevents the sheets from being crumpled laterally against the rail or guide 25.

Thereafter as shown in FIG. 3 the roller 15 is urged down to pinch the sheets 8 and 9 between the rollers 15 and 4. Since the roller 15 is freely rotatable it will continue to rotate in the forward direction. The roller 4 is, however, rotating in the reverse direction so that the underlying sheets 9 will be pushed back onto the stack. Similarly the oppositely rotating rollers 6 and 7 of the separator 5 will push back the underlying sheets 9 while advancing the top sheet 8. Meanwhile the roller 3 is raised so that the sheets being slid back onto the stack 1 under the exiting top sheet 8 will have clear travel.

Figure 4:
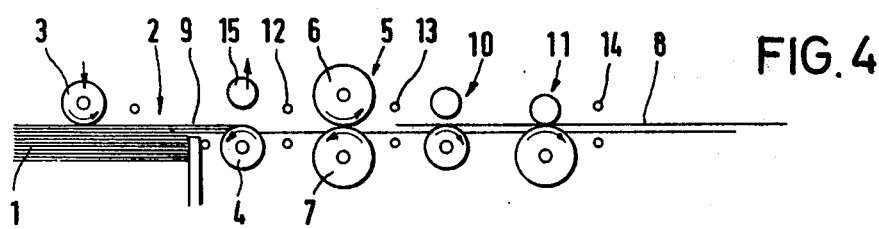

FIG. 4 shows how thereafter the roller 3 is lowered by its cylinder 24 and the roller 15 is raised by its cylinder 26 so that the cycle can repeat itself. The sheet 8 meanwhile is moved out of the apparatus between the rollers 10 and 11. The spacing between following sheets is normally around 120 mm-140 mm.

Figure 5:
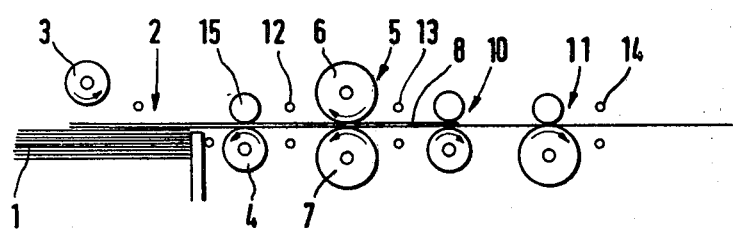
FIGS. 5 and 6 are views similar to FIG. 1 showing an alternative arrangement according to this invention.
Figure 6:
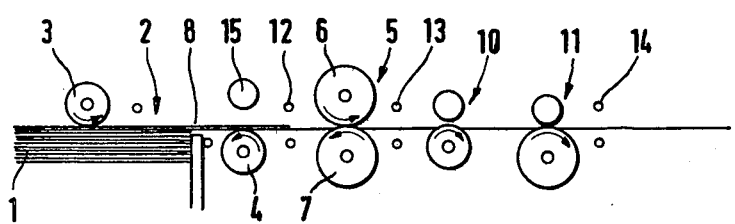

FIGS. 5 and 6 show an arrangement which is usable in systems wherein the sheets 2 need not be aligned with the edge rail 25 or can be aligned with it further on. In this system, when the detector 27 connected to the rollers 10 senses that the spacing between them is greater than the thickness between two sheets 2, indicating that the various upstream separators have failed and more than one sheet 2 is being transported, the controller 16 reverses the rotation direction for these rollers 10 (see FIG. 5) and opens the clutch 19 of the roller 6 so same can be reverse driven through the sheets by the roller 7 to send the sheets back to the stack 1, whereupon the procedure is recommenced (see FIG. 6) to try again to separate them. During this return operation the roller 15 and the roller 3 are lifted to clear the way for the returning sheets.

The system according to the instant invention therefore operates in a simple manner to separate sheets from a stack and orient then for reading or other processing. It can have a very short path of travel for the sheets, thereby minimizing likelihood of a paper jam and making the apparatus as compact as possible.

We claim:

1. A sheet feeder comprising:
a support adapted to hold a stack of sheets;

a straight guide rail extending from said stack parallel to a transport direction and defining a transport path extending in said direction;

a generically cylindrical sheet-forwarding roller above said support and vertically engageable with the topmost sheet of said stack said sheet-forwarding roller being centered on and rotatable about an axis inclined to said direction and rail;

means for rotating said sheet-forwarding roller about the respective axis while in contact with the topmost sheet of said stack for displacing said topmost sheet in said direction and toward said rail;

feed rollers downstream of said sheet-forwarding means for rotating said feed rollers and thereby advancing a sheet engaged thereby along said path in said direction;

means for vertically displacing said sheet-forwarding roller and urging same periodically down into contact with the topmost sheet of said stack;

a stripper roller underneath said path immediately downstream of said stack;

means for rotating said stripper roller in a direction to displace a sheet resting on it back against said transport direction;

a freely rotatable stripper roller above the first-mentioned stripper roller and vertically displaceable into engagement therewith; and means for vertically displacing said freely rotatable roller.

2. The feeder defined in claim 1, further comprising control means connected to both of said means for vertically displacing for urging said freely rotatable roller down only when said forwarding roller is up out of contact with said stack.

3. The feeder defined in claim 1 wherein said axis of said sheet-forwarding roller extends at an angle of between 60° and 89° to said direction.

4. A sheet feeder comprising:
a support adapted to hold a stack of sheets;
a straitht guide rail extending from said stack parallel to a transport direction and defining a transport path extending in said direction;
a generally cylindrical sheet-forwarding roller above said support and vertically engageable with the topmost sheet of said stack, said sheet-forwarding roller being centered on and rotatable about an axis inclined to said direction and rail;

means for rotating said sheet-forwarding roller about the respective axis while in contact with the topmost sheet of said stack for displacing said topmost sheet in said direction and toward said rail;

upper and lower pinch feed rollers downstream of said sheet-forwarding roller;

means for rotating said feed rollers and thereby advancing a sheet engaged thereby along said path in said direction; and means for vertically displacing said sheet-forwarding roller and urging same periodically down into contact wth the topmost sheet of said stack; and means for rotating said lower pinch roller continuously in a direction urging a sheet in contact with it back against said transport direction and for rotating said upper pinch roller discontinuously in a direction urging a sheet in contact with it in said transport direction.

5. The feeder defined in claim 4 wherein said means for rotating said upper pinch roller includes a clutch permitting said upper pinch roller to rotate freely when not driven.

6. A sheet feeder comprising:
a support adapted to hold a stack of sheets;
a generally cylindrical sheet-forwarding roller above said support and vertically engageable with the topmost sheet of said stack, said sheet-forwarding roller being centered on and rotatable about an axis inclined to a transport direction defining a transport path extending in said direction;

means for rotating said sheet-forwarding roller about the respective axis while in contact with the topmost sheet of said stack for displacing said topmost sheet in said direction and toward said rail;

feed rollers downstream of said sheet-forwarding roller;

means for rotating said feed rollers and thereby advancing a sheet engaged thereby along said path in said direction;

a downstream pair of feed rollers flanking said path;
means for detecting the spacing between said pair of feed rollers; and means for reverse driving said pair of feed rollers to advance any sheets engaged therebetween back against said direction when the spacing between said pair of rollers exceeds the thickness of a single sheet.

* * * * *